(12) United States Patent
Choi et al.

(10) Patent No.: US 9,458,963 B1
(45) Date of Patent: Oct. 4, 2016

(54) 360-DEGREE GIMBAL SYSTEM

(71) Applicant: SwiftCam Technologies Group Company Limited, Hong Kong (HK)

(72) Inventors: Wa Fung Choi, Hong Kong (HK); Chung Wai Cheung, Hong Kong (HK); Ki Lung Cheung, Hong Kong (HK)

(73) Assignee: SWIFTCAM TECHNOLOGIES GROUP COMPANY LIMITED, Hong Kong (HK)

( * ) Notice: Subject to any disclaimer, the term of this patent is extended or adjusted under 35 U.S.C. 154(b) by 0 days.

(21) Appl. No.: 15/084,562

(22) Filed: Mar. 30, 2016

Related U.S. Application Data (60) Provisional application No. 62/141,245, filed on Mar. 31, 2015.

(51) Int. Cl.
*F16M 13/02* (2006.01)
*G01P 15/08* (2006.01)
*G01C 19/00* (2013.01)

(52) U.S. Cl.
CPC ............ *F16M 13/022* (2013.01); *G01C 19/00* (2013.01); *G01P 15/08* (2013.01)

(58) Field of Classification Search
CPC .... G03B 17/56; G03B 17/561; G03B 37/02; G01P 15/08; G01C 19/00; F16M 13/022; F16M 11/10; F16M 11/2014; F16M 11/242; F16M 11/18; F16M 11/42; F16M 11/04; F16M 11/14; F16M 11/2078; F16M 2200/041; F16M 2200/044; F16M 13/04; H04N 5/232; H04N 5/23203; H04N 5/23216; H04N 5/23238; B64C 2201/127; B64D 47/08; A45F 5/10

USPC ......................................................... 348/376

See application file for complete search history.

(56) References Cited

U.S. PATENT DOCUMENTS

| | | | | |
|---|---|---|---|---|
| 9,213,220 | B2 * | 12/2015 | Fowler | G03B 17/56 |
| 9,360,740 | B2 * | 6/2016 | Wagner | F16M 11/18 |
| 2006/0269264 | A1 * | 11/2006 | Stafford | G03B 15/00 396/56 |
| 2009/0257741 | A1 * | 10/2009 | Greb | F16M 13/04 396/55 |
| 2010/0079101 | A1 * | 4/2010 | Sidman | F16M 11/041 318/649 |
| 2012/0062691 | A1 * | 3/2012 | Fowler | F16M 11/10 348/36 |
| 2013/0321656 | A1 * | 12/2013 | Ducharme | H04N 5/23203 348/211.1 |
| 2014/0211975 | A1 * | 7/2014 | Roberts | G03B 17/561 381/361 |
| 2015/0308618 | A1 * | 10/2015 | Valero | F16M 13/04 700/213 |

* cited by examiner

*Primary Examiner* — Pritham Prabhakher (57) ABSTRACT

A 360-degree gimbal device includes an upright support, a pan motor rotatably coupled with a hollow shaft mounted on the support, a slip ring disposed in the hollow shaft, a first arm having a proximal end attached to the pan motor so that the first arm is freely rotatable 360° about a pan axis, a roll motor connected with a distal end of the first arm, a second arm having a proximal end attached to the roll motor so that the second arm is rotatable 270° about a roll axis, a tilt motor connected with a distal end of the second arm, a holder attached to the tilt motor so that the holder is rotatable ±60° about a tilt axis. The gimbal device is in wireless communication with a mobile device which has a mobile application for generating a plurality of image-shooting modes based on a plurality of customized paths.

7 Claims, 9 Drawing Sheets

360-DEGREE GIMBAL SYSTEM

CROSS-REFERENCE TO RELATED APPLICATIONS

This application claims the benefit of U.S. Provisional Patent Application No. 62/141,245, filed Mar. 31, 2015, the entire content of which is hereby incorporated by reference.

FIELD OF THE TECHNOLOGY

The present application relates generally to a gimbal system, and particularly to a wireless automated gimbal device that can achieve different image shooting modes based on different customized paths, and that the device can rotate 360° freely about a pan axis.

BACKGROUND i. Existing devices
  1. There are many camera stands which can provide 2-axis (Pan and Tilt) angular motions. These devices operate manually without any electronic units such as motors or automated controller.
  2. There are some Wireless Internet Protocol (IP) Camera which can provide 2-axis angular motion including Pan and Tilt. They work with a limited operation angle through two electronic motors. They are attached on wall of buildings and are operated with AC power indoor.
ii. Existing control of the device
  1. Besides auto-stabilizing, some existing devices can be controlled with digital/analog controllers attached to the device itself.
iii. Existing shooting methods
  1. "Spherical mode" in "Google Camera" android mobile application
    a. Example of existing application:
      1. User manually moves the camera according to the hints on the camera application. Those hints cover all angles required for generating a spherical image. A spherical image is an image which covers the vertical views angle instead of a fixed horizontal panorama.
    b. Steps to take a "spherical image" using the "Google Camera" Application
      1. User starts the "Google Camera" application and changes to "Spherical mode"
      2. User stands at the center of the shooting environment
      3. User manually positions the camera such that the circle fits to the dots that the application suggested.
      4. User can stop at any time by clicking a "stop" button to generate "Spherical image" using existing images taken, or it will stop when all "dots" are completed.
      5. The "Spherical image" is generated by stitching all separate images together using stitching & image warping algorithm, and can be viewed in a special "Spherical image viewer", which can be dragged or tilted to "look around".
  2. "Panorama mode" in "Google Camera" android mobile application
    a. Example of existing application:
      1. User rotates the camera horizontally to capture a horizontal pan shot, which will result in a wider view of image. The image is generated by stitching multiple images together.
    b. Steps to take a "Panorama" using the "Google Camera" application
      1. User open starts "Google Camera" application and changes to "Panorama mode"
      2. User stands in front of the shooting environment
      3. User pans the mobile camera slowly until an indicator indicates "finished".
  3. "Hyperlapse" application
    a. What is "Hyperlapse"
      1. A movie composed of images taken at a regular interval. For example, take 240 images in 24 hours and play in 10 sec. So the movie will look like a "fast forwarded" movie.
      2. Instead of a still shooting angle & direction. User can tilt & pan the camera stand bit by bit in each shot to achieve a "Panning" video.
    b. Example of taking a hyperlapse video
      1. User sets a timer in the camera to shoot at a regular interval
      2. User manually moves the stand bit by bit at a regular interval same as the timer set in the camera
      3. User manually imports all photos and produces a movie in software.
iv. Gyro-shift problem
  1. Some smart phones do not come with a digital compass or do not use the digital compass data during spherical shooting mode. As a result, gyroscope will be affected by the changing magnetic field caused by earth rotation. This error will accumulate in time and will lead to inaccurate Pan axis gyroscope data and result in significant stitching artifacts.
    a. The existing camera application expects a user to capture an image within 2-3 minutes such that the gyro-shift problem is minimized.

The above description of the background is provided to aid in understanding the 360-degree gimbal device, but is not admitted to describe or constitute pertinent prior art to the 360-degree gimbal device, or consider the cited documents as material to the patentability of the claims of the present application.

SUMMARY

The present application is directed to a 360-degree gimbal device. In an aspect, the device includes an upright support; a pan motor rotatably coupled with a hollow shaft mounted on an upper open end of the upright support; a slip ring disposed within the hollow shaft; a first arm having a proximal end attached to the pan motor such that the first arm is freely rotatable 360° relative to the upright support about a pan axis; a roll motor connected with a distal end of the first arm; a second arm having a proximal end attached to a rotatable part of the roll motor such that the second arm is rotatable 270° relative to the first arm about a roll axis perpendicular to the pan axis; a tilt motor connected with a distal end of the second arm; an image-capturing device holder attached to a rotatable part of the tilt motor such that the holder is rotatable ±60° relative to a horizontal plane perpendicular to the upright support about a tilt axis orthogonal to the pan and roll axes; a wireless communication unit for wirelessly receiving and transmitting signals between the gimbal device and a mobile device, the mobile device comprising a mobile application for generating a plurality of image-shooting modes based on a plurality of customized paths; a center processing unit for converting command signals from the wireless communication unit to pulse width modulation (PWM) signals, and processing motion signals including gyroscope and acceleration signals and converting these signals into angle signals; a motor controller electrically connected with the pan, roll and tilt motors and used for receiving the PWM signals from the center processing unit and providing corresponding voltages to drive the pan, roll and tilt motors thereby generating angular motions in the pan, roll, tilt axes respectively; and an inertial measurement unit (IMU) sensor for sensing the angular motion of the gimbal device in each axis in every looping.

In another aspect, the gimbal device includes an upright support; a pan motor rotatably coupled with a hollow shaft mounted on an upper open end of the upright support; a slip ring disposed within the hollow shaft; a first arm having a proximal end attached to the pan motor such that the first arm is rotatable relative to the upright support about a pan axis; a roll motor connected with a distal end of the first arm; a second arm having a proximal end attached to a rotatable part of the roll motor such that the second arm is rotatable relative to the first arm about a roll axis perpendicular to the pan axis; a tilt motor connected with a distal end of the second arm; and a holder attached to a rotatable part of the tilt motor such that the holder is rotatable about a tilt axis orthogonal to the pan and roll axes.

Although the 360-degree gimbal device is shown and described with respect to certain embodiments, it is obvious that equivalents and modifications will occur to others skilled in the art upon the reading and understanding of the specification. The 360-degree gimbal device in the present application includes all such equivalents and modifications, and is limited only by the scope of the claims.

BRIEF DESCRIPTION OF THE DRAWINGS

Specific embodiments of the 360-degree gimbal device will now be described by way of example with reference to the accompanying drawings wherein.

DETAILED DESCRIPTION

Reference will now be made in detail to a preferred embodiment of the 360-degree gimbal device, examples of which are also provided in the following description. Exemplary embodiments of the 360-degree gimbal device are described in detail, although it will be apparent to those skilled in the relevant art that some features that are not particularly important to an understanding of the 360-degree gimbal device may not be shown for the sake of clarity.

Furthermore, it should be understood that the 360-degree gimbal device is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

In addition, improvements and modifications which may become apparent to persons of ordinary skill in the art after reading this disclosure, the drawings, and the appended claims are deemed within the scope of the protection.

For illustration purposes, the terms such as "upright", upper", "lower", "vertical", "horizontal", "top", "bottom" appeared hereinafter relate to the invention as it is oriented in the drawings. It is understood that the invention may assume various positions, except where expressly specified to the contrary. Furthermore, it is understood that the specific devices shown in the drawings, and described in the following description, are simply exemplary embodiments of the invention.

Hence, specific dimensions and other physical characteristics related to the embodiments disclosed hereinafter are not to be considered as limiting.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

FIGS. 1-5 show different views of a 360-degree gimbal device 10 according to an embodiment of the present application. The 360-degree gimbal device 10 may include three motors, namely a pan motor 14, a roll motor 24, and a tilt motor 34, mounted on an upright support 12 of the gimbal device 10. The three motors 14, 24, 34 may be brushless motors for controlling angular motions of the three motors 14, 24, 34 about three axes x, y, z respectively. The pan motor 14 may be rotatably coupled with a hollow shaft 16 mounted on an upper open end of the upright support 12.

A slip ring 18 may be disposed within the hollow shaft 16. A plurality of first electrical wires 40 extending from a lower end of the slip ring 18 can be electrically connected with a printed circuit board 44 provided in the upright support 12, and a plurality of second electrical wires 42 extending from an upper end of the slip ring 18 can be electrically connected with the pan, roll and tilt motors 14, 24, 34.

Figure 1:
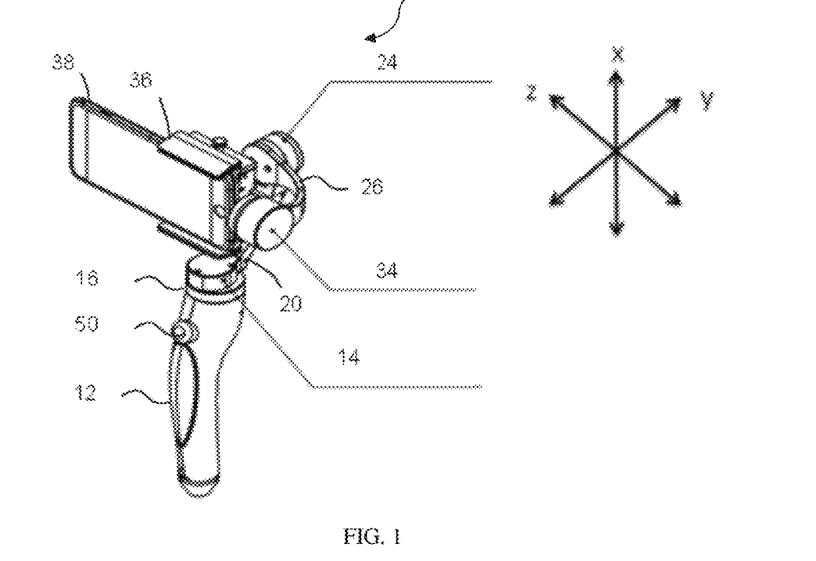
FIG. 1 is a perspective view of the 360-degree gimbal device according to an embodiment of the present application.
Figure 2:
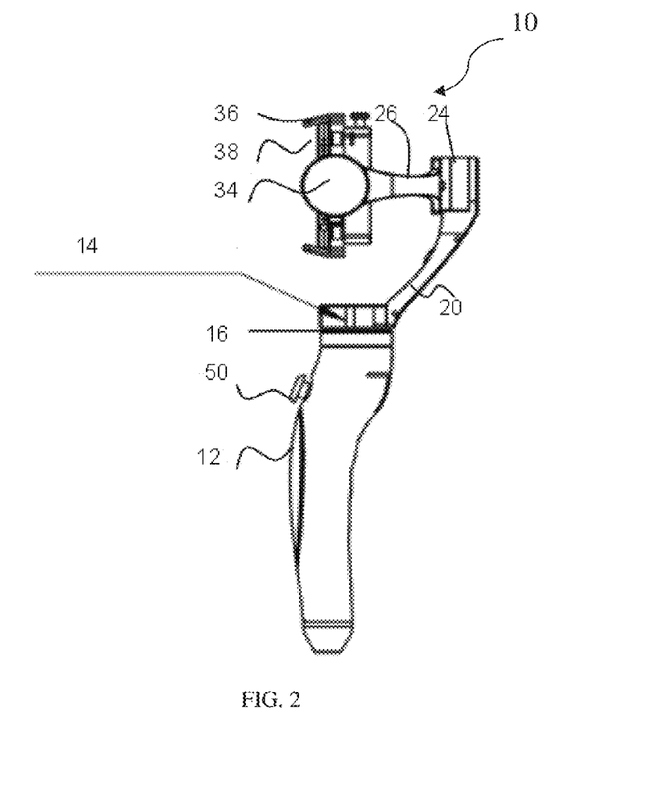
FIG. 2 is a side view of the 360-degree gimbal device of FIG. 1.
Figure 3:
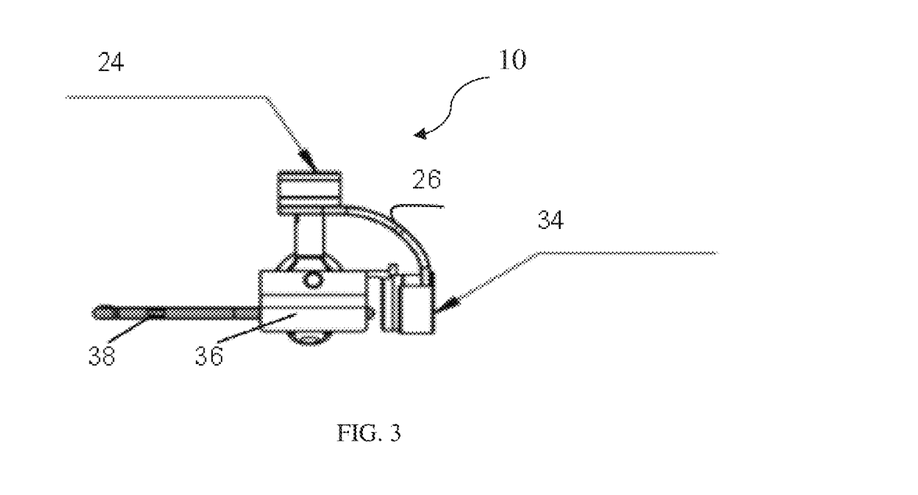
FIG. 3 is a top view of the 360-degree gimbal device of FIG. 1.
Figure 4:
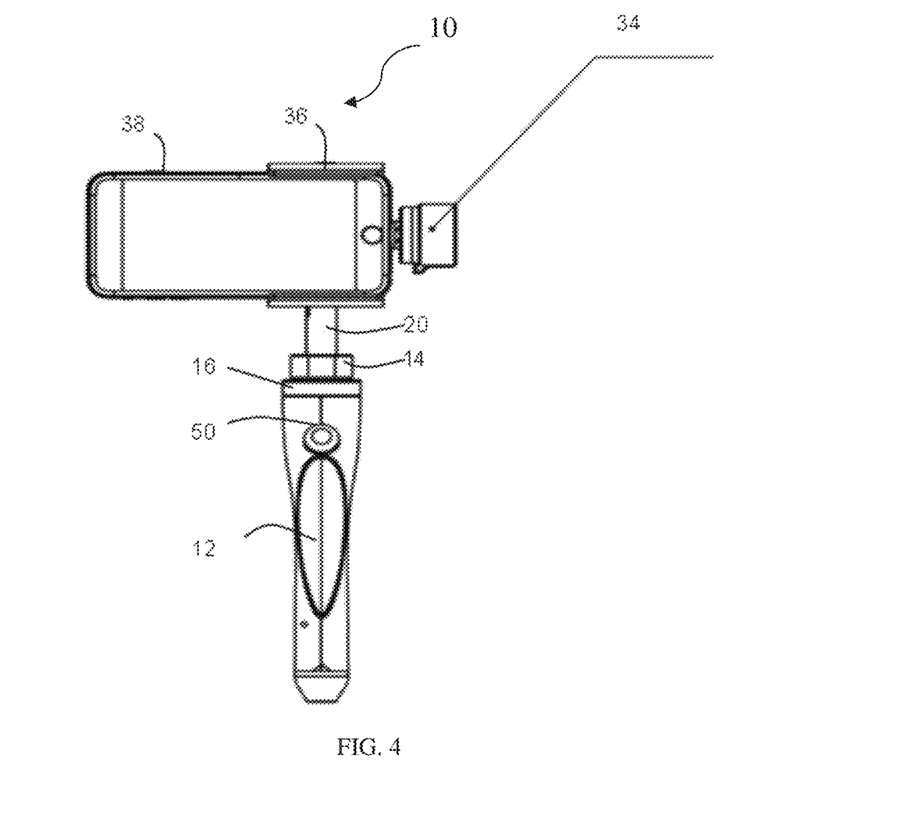
FIG. 4 is a front view of the 360-degree gimbal device of FIG. 1.
Figure 5:
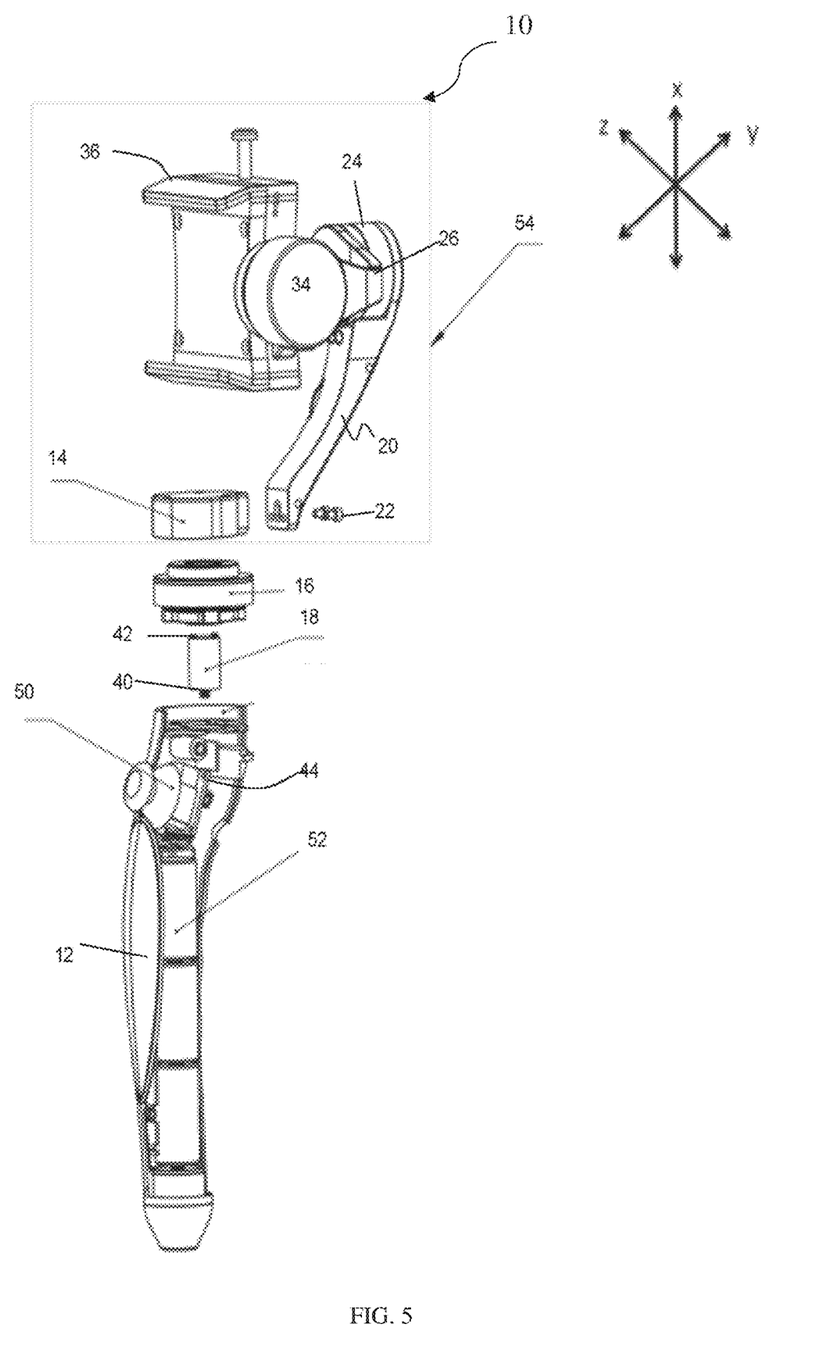
FIG. 5 is a partial exploded view of the 360-degree gimbal device of FIG. 1.
Figure 6:
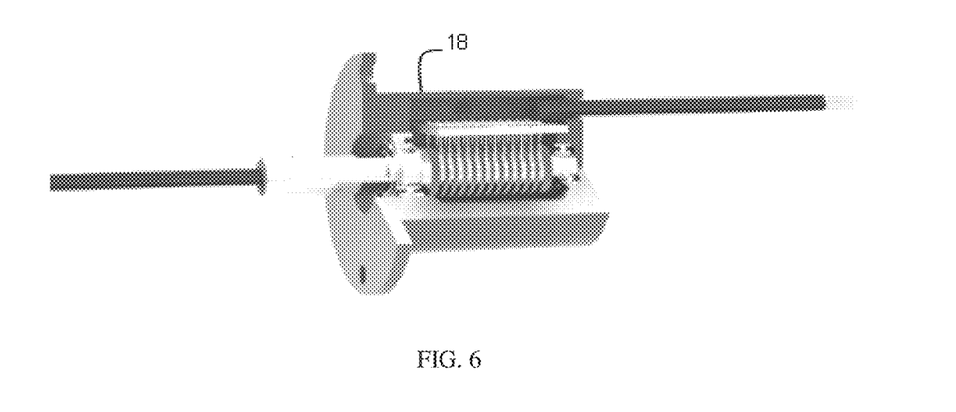
FIG. 6 is a cutaway perspective view of a slip ring of the prior art.
Figure 7:
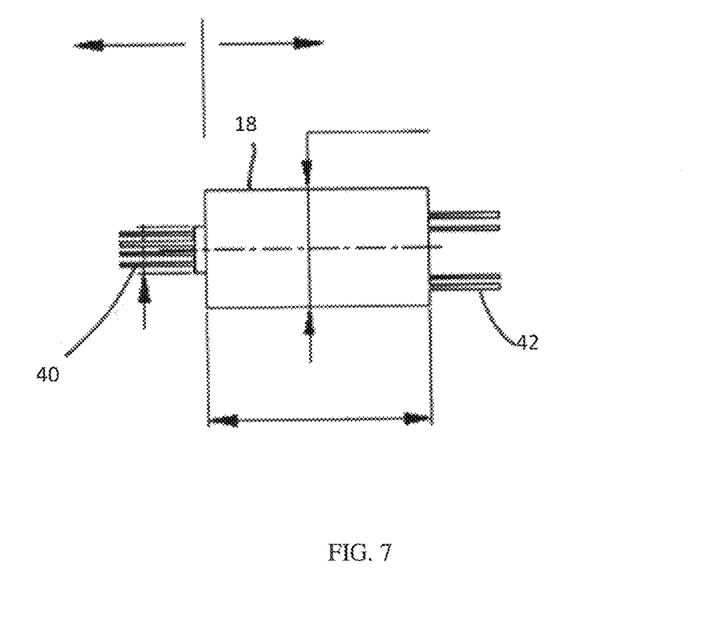
FIG. 7 is an illustrative diagram of a slip ring of the prior art.

FIGS. 6 and 7 show different views of a conventional slip ring that may be used in the gimbal device 10 of the present application. Slip ring is an electromechanical device that allows the transmission of power and electrical signals from a stationary to a rotating structure. A slip ring can be used in any electromechanical system that requires unrestrained, intermittent or continuous rotation while transmitting power and/or data. It can improve mechanical performance, simplify system operation and eliminate damage-prone wires dangling from movable joints.

The gimbal device 10 may include a first arm 20 having a proximal end and a distal end. The proximal end of the first arm 20 can be attached to a side of the pan motor 14 in such a manner that the first arm 20 can be freely rotatable 360° relative to the upright support 12 about a pan axis x. The first arm 20 may be attached to the pan motor 14 by a set of screws 22 or any other suitable fastening means.

The roll motor 24 may be connected with the distal end of the first arm 20. The gimbal device 10 may include a second arm 26 having a proximal end and a distal end. The proximal end of the second arm 26 may be attached to a rotatable part of the roll motor 24 in such a manner that the second arm 26 can be rotatable 270° relative to the first arm 20 about a roll axis y perpendicular to the pan axis x.

The tilt motor 34 may be connected with the distal end of the second arm 26. A holder 36 for holding, for example, an image-capturing device 38 may be attached to a rotatable part of the tilt motor 34 in such a manner that the holder 36 can be rotatable ±60° relative to a horizontal plane perpendicular to the upright support 12 about a tilt axis z orthogonal to the pan and roll axes (x, y).

Figure 8:
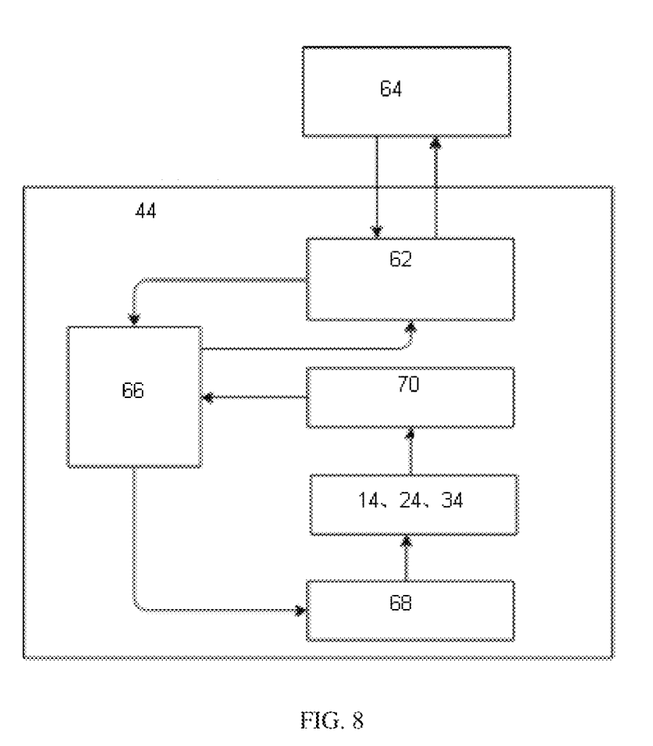
FIG. 8 is a block diagram showing a Bluetooth® device and a main PCB of the 360-degree gimbal device according to an embodiment of the present application.

The printed circuit board 44 may include a wireless communication unit 62 for wirelessly receiving and transmitting signals between the gimbal device 10 and a mobile device 64. The wireless communication unit 62 of the gimbal device 10 can be communicated with the mobile device 64 via Bluetooth® or WiFi or any other wireless communication device. The mobile device 64 may include a mobile application for generating a plurality of image-shooting modes based on a plurality of customized paths.

The printed circuit board 44 may further include a center processing unit 66 for converting command signals from the wireless communication unit 62 to pulse width modulation (PWM) signals, and processing motion signals including gyroscope and acceleration signals and converting these signals into angle signals.

The printed circuit board 44 may also include a motor controller 68 electrically connected with the pan, roll and tilt motors 14, 24, 34. The motor controller 68 can be used to receive the PWM signals from the center processing unit 66 and provide corresponding voltages to drive the pan, roll and tilt motors 14, 24, 34, thereby generating angular motions in the pan, roll, tilt axes x, y, z respectively.

The printed circuit board 44 may further include an inertial measurement unit (IMU) sensor 70 for sensing the angular motion of the gimbal device in each axis in every looping.

A plurality of batteries 52 may be provided in the handle or upright support 12 for supplying electrical power to the pan, roll and tilt motors 14, 24, 34 and the electrical components mounted on the printed circuit board 44.

The gimbal device 10 may include a joystick 50 provided on the upright support 12 for manually controlling the pan, roll and tilt motors 14, 24, 34.

The 360-degree gimbal device 10 of the present application can automate different shooting methods using a 3-axis gimbal device. Beside normal handheld usage which gives extra stabilizing function to offset vibrations, a user can stand the 360-degree gimbal device 10 of the present application on a base accessory (e.g. tripod). The gimbal device 10 of the present application can be controlled to move a mobile device such as a smart phone or smart watch.

Additionally, other imaging devices, such as a camera module or even other action cameras like GoPro, are applicable. A user can save the effort of manually moving a camera around, or moving a camera stand in a regular intervals to achieve different shooting modes stated above. The gimbal device 10 of the present application also helps to significantly improve accuracy in the capturing process by reducing/taking away human errors.

The 3-axis gimbal device 10 can be operated by three brushless motors which can control the pan, roll and tilt axes. The pan, roll and tilt angles (operation angles) may be continuous 360 degrees, 270 degrees and +−60 degrees respectively.

In the 360-degree gimbal device 10 of the present application, wireless control can be adopted. Besides a joystick analog control, the gimbal device of the present application can be controlled wirelessly. User no longer needs to hold the device in order to control its shooting angle. A user can now control the device within a range of 8 to 20 meters.

Once the mobile application is paired up with the device, a user can even control the device over the Internet. The user can send a control command over the internet from another smart device such as a smart watch. The command will be executed in a mobile device such as a smart phone which has already been wirelessly connected to the device.

Furthermore, the 360-degree gimbal device 10 of the present application can overcome gyro-shift problem in "Spherical shooting" mode. The 360-degree gimbal device 10 of the present application acts as an external gyroscope, which may include a magnetic compass, and can be used to overcome the gyro-shift problem. A user can shoot as fast as possible. An optimized path can be programmed to minimize artifacts. The device must tilt from top to bottom in each rotation.

Operating Process

The electrical power and signals from the handle or upright support 12 (stationary part), including signals from the joystick 50 and battery power from the batteries 52 can be transmitted to an upper part 54 (rotating part) of the gimbal device 10 via the slip ring 18 which may be installed in the hollow shaft 16. The signals from the stationary part are first connected directly to the stationary part of the slip ring 18 and come out from the rotating part of the slip ring 18. The signals are then connected to the electronic devices on the rotating part of the gimbal device 10 by connecting directly to the wires from the rotating part of the slip ring 18.

This structure allows a continuous rotation on each of the axes x, y, z and eliminates damage wires dangling from movable joints in a gimbal system while transmitting power and data.

It greatly improves the operating angle of the gimbal device 10 to an unlimited rotating range given in accordance with specific programming. This is so-called the 360-degree gimbal technique.

FIG. 8 is a block diagram showing a mobile device with Bluetooth® and a main PCB of the 360-degree gimbal device according to an embodiment of the present application.

1. Bluetooth® Device from Mobile Device 64: Mobile Application running on mobile devices 64 such as Android or iOS can send signals over Bluetooth® to the Wireless communication unit 62.

2. Wireless Communication Unit 62: Receives and transmits signals between the 3-axis Gimbal Device 10 and the Mobile Device 64.
3. Center Processing Unit 66: Convert command signals to pulse width modulation (PWM) signals as well as processing motion signals including gyroscope and acceleration signals. Convert these signals into angle signals.
4. Motor Controller 68: Receive PWM signals from the Center Processing Unit and provide corresponding voltages to drive the three motors 14, 24, 34 in the 3-axis gimbal device 10.
5. Motor in each axis 14, 24, 34: Receive the voltage from the Motor Controller 68 and generate angular motion in the pan, roll and tilt axes x, y, z.
6. Inertial Measurement Unit (IMU) Sensor 70: Sense the corresponding angular motion of the gimbal device 10 in each axis x, y, z in every looping.

Wireless Communication Unit 62 receives an instruction from the Mobile Application via a Bluetooth® Device of the Mobile Device 64. The raw data of the instruction is then transmitted to the Center Processing Unit 66 and translated to a PWM signal which is sent to the Motor Controller 68, and is converted into a voltage signal before sending to the three motors 14, 24, 34. The motors 14, 24, 34 along the pan, roll, tilt axes x, y, z can be powered by the Voltage Signal and generate the corresponding angular motion.

The real time motion is then detected by the IMU Sensor 70 which may include a 3-axis Gyroscope and 3-axis Acceleration. These signals are combined to form a stable angle signal inside the Center Processing Unit 66. It is compared with the original instruction given by the Mobile Application and decided to continuously generate motion of each axis or not. If the target angle is reached, a confirmation signal may then be transmitted to the Mobile Application from the Center Processing Unit 66 through the Wireless Communication Unit 62. The entire instruction is then completed. The system may then execute the next command by following the same sequence as before.

Figure 9:
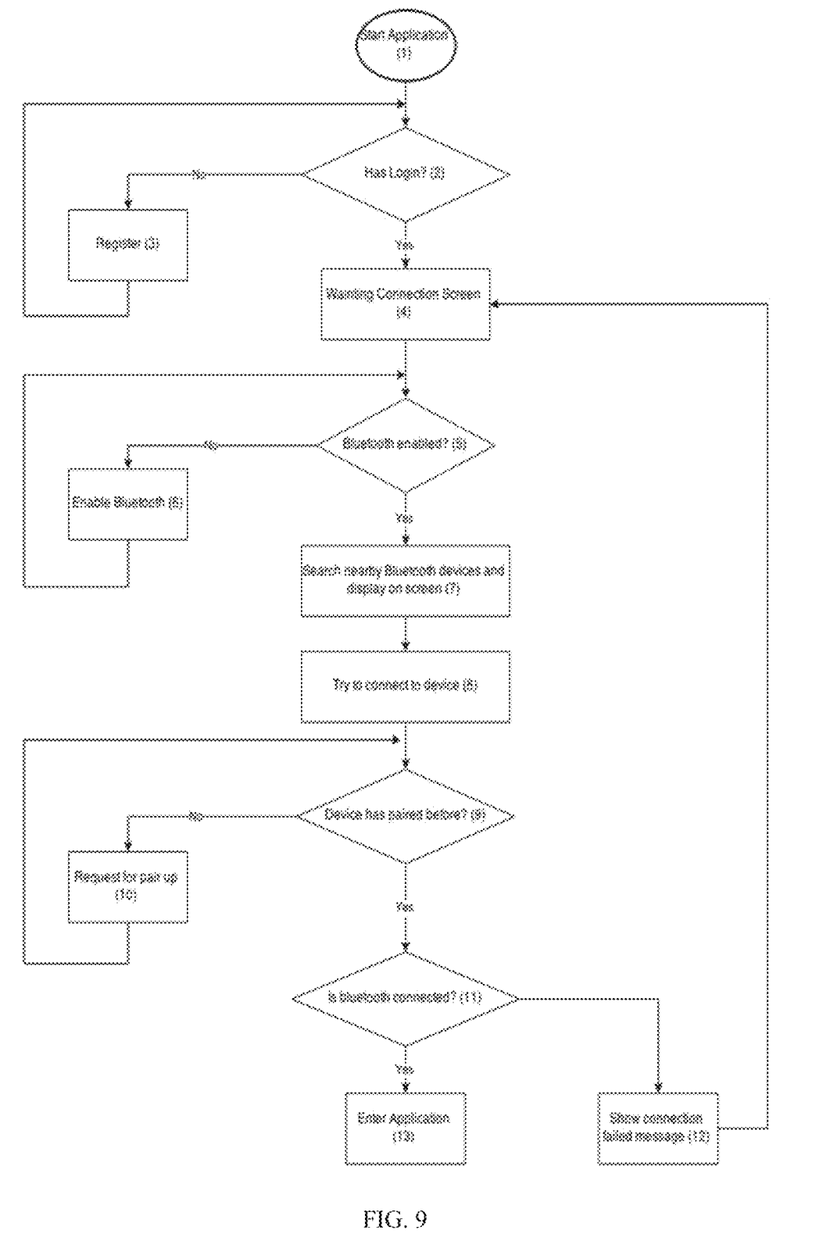
FIG. 9 is a flow chart of the application of the 360-degree gimbal device according to an embodiment of the present application.
Figure 10:
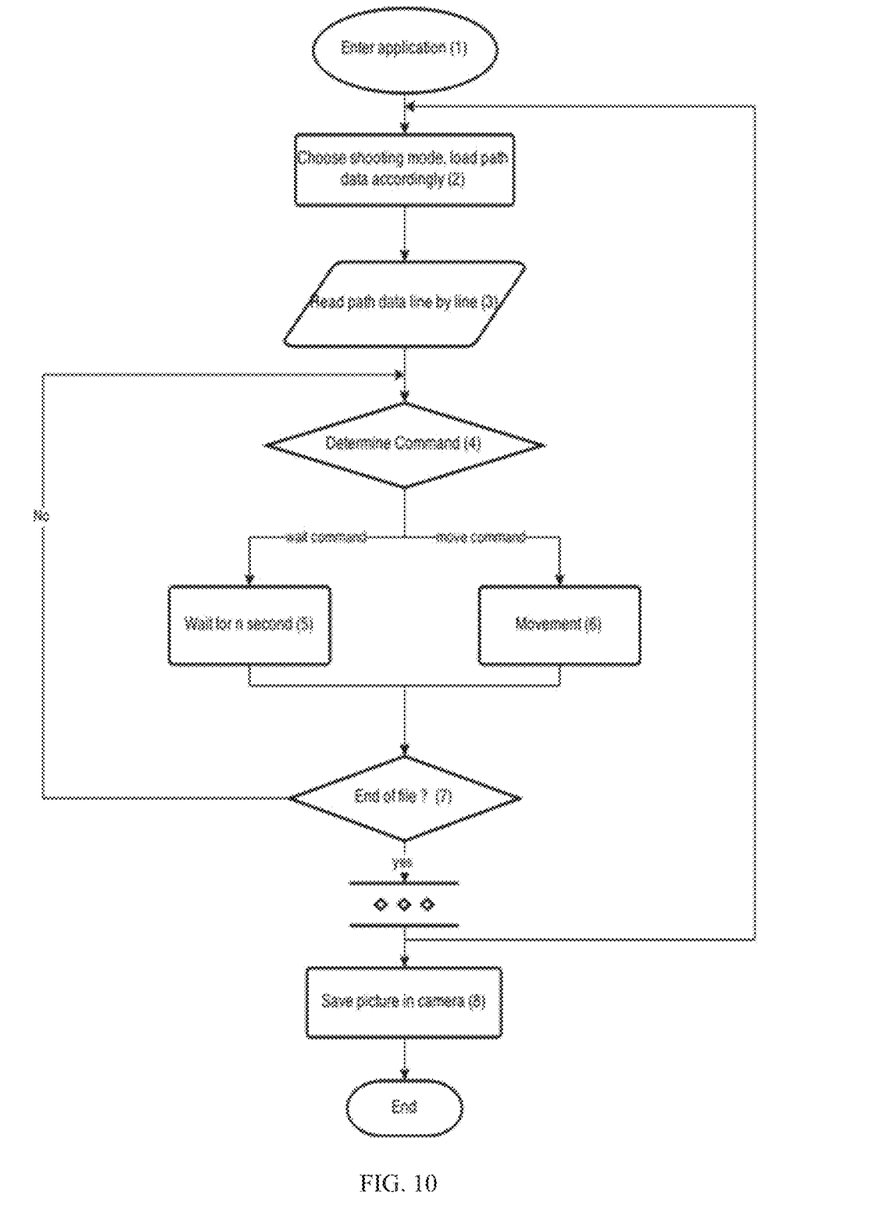
FIG. 10 is a flow chart of the movement of the 360-degree gimbal device according to an embodiment of the present application.

APPLICATION DESCRIPTION i. Flow chart with explanation on each step:
1. FIG. 9 shows a flow chart of wireless controlled application (ref: appflow_01)
    1. Start Application
        i. User starts the device, attaches a smartphone on the device and starts the application
    2. Has Login?
        i. Determine the user has logged in the application
    3. Register
        i. User clicks a "register" button and switches to register page
    4. Waiting Connection screen
        i. A screen showing a "connect" button which allows a user to choose a device to connect with.
    5. Bluetooth® enabled?
        i. Check if Bluetooth® is enabled
    6. Enable Bluetooth®
        i. Automatically enable Bluetooth® or enable Bluetooth® from a popup window
    7. Search nearby Bluetooth® devices and display on screen
        i. Discover nearby Bluetooth® devices and show them on a popup list. Try to connect with the device
    8. Try to connect to device
        i. The application will try to connect with the selected device.
    9. Device has paired before?
        i. Check the device if it has paired
    10. Request for pair up
        i. Make a first connection and bring up pair up device popup or automatically pair up in background
    11. Is Bluetooth® connected?
        i. Check if the device is connected via Bluetooth®
    12. Show connection failed message
        i. Popup a "connection failed" message and return to connection screen
    13. Enter application
        i. Enter the camera application
2. FIG. 10 shows a flow chart of moving the device with a pre-defined path (appflow_02)
    1. Enter application
        i. Assume user has placed the camera or image-capturing device on the stabilizing device (i.e. gimbal device) and it has been placed on a base accessory. User has already started the application and connected with the device.
    2. Choose shooting mode, load path data accordingly
        i. User chooses different shooting modes, such as "Spherical Panorama", "Horizontal Panorama", or "Hyperlapse".
        ii. Paths can be set by anyone to fit their needs
    3. Read path data line by line
        i. By choosing different modes, it will load the corresponding pre-defined path and send move commands to the device line-by-line.
    4. Determine command
        i. It can be a move command or a wait command (ref: app_ex_cmd_01)
    5. Wait for n second
        i. The application will stop for n seconds until it sends another command
    6. Movement (ref: app_device_sequence)
        i. The application will send movement command to the device
    7. End of file?
        i. The end of file determines whether the path has completed or not
    8. Save picture in camera
        i. Compute a stitched image based on the images taken in the previous process. (ref: ref_app_01)

Figure 11:
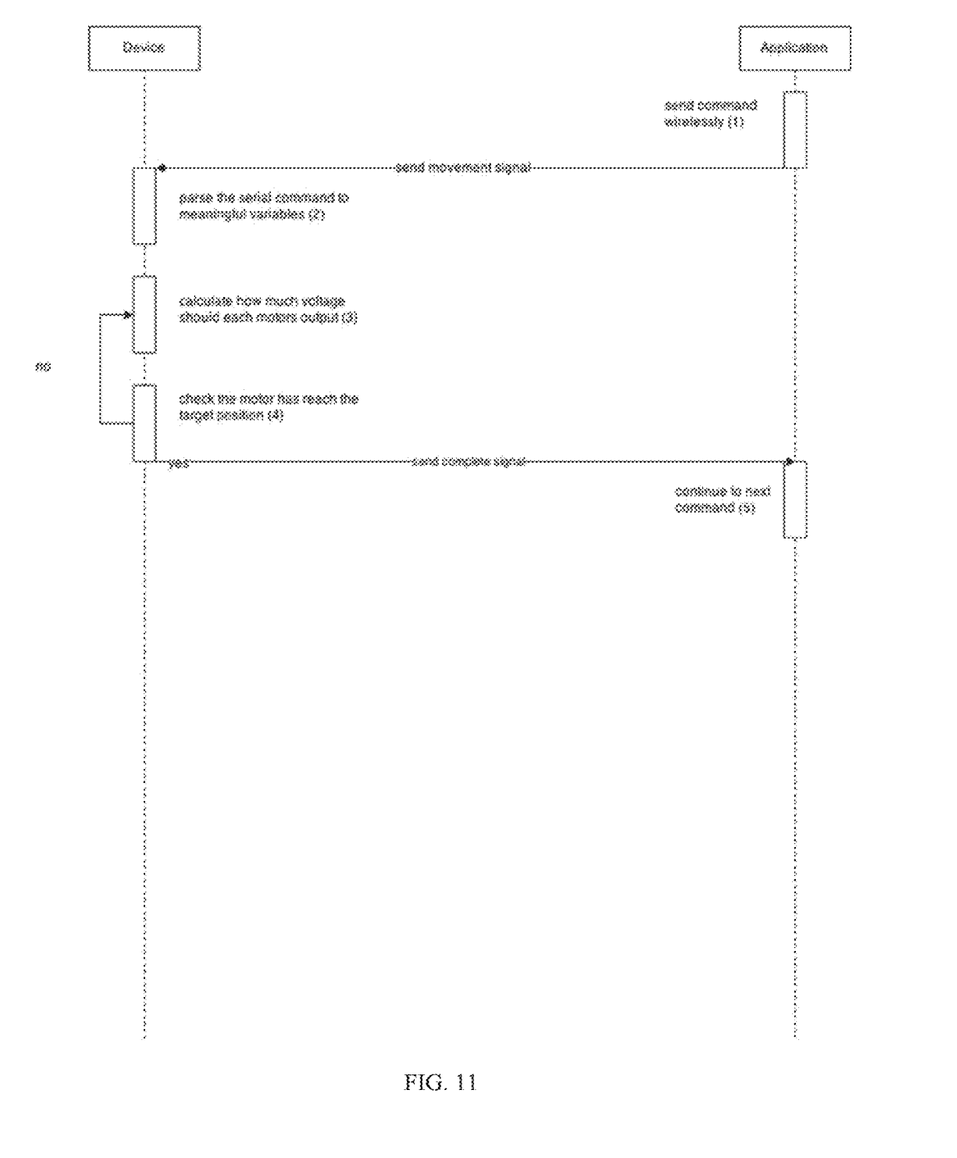
FIG. 11 is a sequence diagram of a device/application communication of the 360-degree gimbal device according to an embodiment of the present application.
Figure 12:
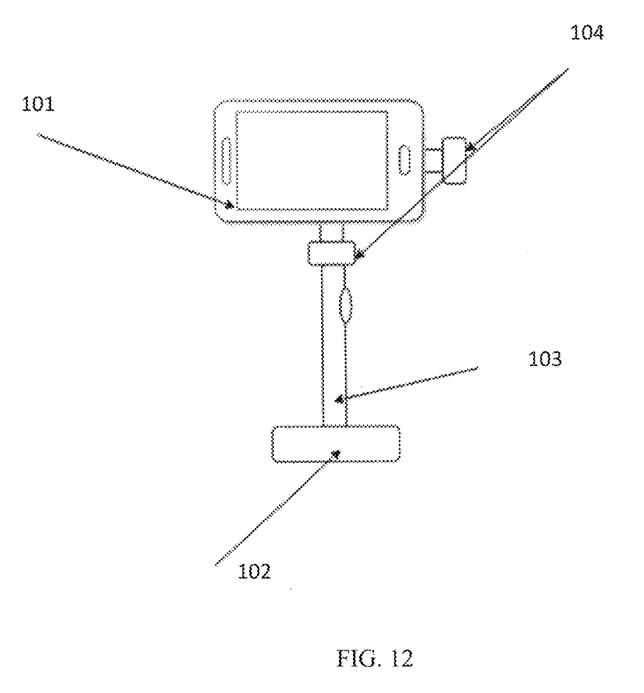
FIG. 12 is an example of a device/application control of the 360-degree gimbal device according to an embodiment of the present application.

Device/Application Communication
i. FIG. 11 is a sequence diagram of device/application communication (ref: app_device_sequence)
    1. Send command wirelessly
        a. Send command specify in (ref: appflow_02-6)
    2. Parse the serial command to meaningful variables
        a. Device CPU checksum the serial command from Bluetooth® to validate a command
    3. Calculate how much voltage should each motor output
        a. Firmware within the device calculates how much voltage should output to each motor
    4. Check the motor has reached the target position
        a. Firmware within the device check the motor and combine the data with gyroscope and determine the motor has reached the target
    5. Continue to next command
        a. Send a complete signal back to application so it can send the next command ii. FIG. 12 shows an example of application device/application control (ref: app_device_communication_physical)
- a. Legend
  1. Mobile device that has application installed 101
  2. Base or Base accessory 102
  3. Device itself 103
  4. Motors on the device 104
- b. Control flow
  1. Device 103 is standing on base accessory 102
  2. Mobile device 101 sends wireless signal to device 103
  3. Device 103 calculates how much need to output to fulfil signal from mobile device101
  4. Motors on the device 104 move according to device 103
  5. Mobile device 101 can achieve different shooting mode according to the mode selected by a user
  6. Mobile device 101 can separately be taken away from base accessory 102 and use separately as a camera stabilizer. It will have stabilizing function alone.

Ways of Wireless Control
- i. There are several ways of wireless control, such as Bluetooth®, WiFi, etc. The device has implement Bluetooth® as wireless control. However, other wireless connection mechanisms are applicable.
- ii. Protocol
  1. The command sent to the device must follow a custom protocol only the device can recognized.
     - a. Example of protocol consists of the following elements
       1. Header
          1. A header element to notice the device the start of command
       2. Checksum
          1. A checksum to validate a packet
       3. Device ID
          1. A custom ID for identifying different version of hardware
       4. Data length
          1. Date length of the payload
       5. Command
          1. Command can be mode of moving, etc.
       6. Data
          1. Depends on command IMG: appflow_01
IMG: appflow_02
IMG app_device_communication_physical
IMG app_device_sequence

Examples app_ex_cmd_01
0: move_to(x: 60, y: 10)
1: wait 3 seconds
2: move_to(x: 60, y: 20)
3: wait 3 seconds
4: move_to(x: 70. y: 20)
5 wait 3 seconds
etc. . . .

REFERENCES ref_app_01
Stitching methods are implemented based on existing image stitching flow, together with the device gyroscope & magnetic compass data to make the stitching process faster.

What is claimed is:

1. A 360-degree gimbal device (10) comprising:
   (a) an upright support (12);
   (b) a pan motor (14) rotatably coupled with a hollow shaft (16) mounted on an upper open end of the upright support (12);
   (c) a slip ring (18) disposed within the hollow shaft (16);
   (d) a first arm (20) having a proximal end attached to the pan motor (14) such that the first arm (20) is freely rotatable 360° relative to the upright support (12) about a pan axis (x);
   (e) a roll motor (24) connected with a distal end of the first arm (20);
   (f) a second arm (26) having a proximal end attached to a rotatable part of the roll motor (24) such that the second arm (26) is rotatable 270° relative to the first arm (20) about a roll axis (y) perpendicular to the pan axis (x);
   (g) a tilt motor (34) connected with a distal end of the second arm (26);
   (h) an image-capturing device holder (36) attached to a rotatable part of the tilt motor (34) such that the holder (36) is rotatable ±60° relative to a horizontal plane perpendicular to the upright support (12) about a tilt axis (z) orthogonal to the pan and roll axes (x, y);
   (i) a wireless communication unit (62) for wirelessly receiving and transmitting signals between the gimbal device (10) and a mobile device (64), the mobile device (64) comprising a mobile application for generating a plurality of image-shooting modes based on a plurality of customized paths;
   (j) a center processing unit (66) for converting command signals from the wireless communication unit (62) to pulse width modulation (PWM) signals, and processing motion signals including gyroscope and acceleration signals and converting these signals into angle signals;
   (k) a motor controller (68) electrically connected with the pan, roll and tilt motors (14, 24, 34) and used for receiving the PWM signals from the center processing unit (66) and providing corresponding voltages to drive the pan, roll and tilt motors (14, 24, 34) thereby generating angular motions in the pan, roll, tilt axes (x, y, z) respectively; and
   (l) an inertial measurement unit (IMU) sensor (70) for sensing the angular motion of the gimbal device in each axis in every looping.

2. The gimbal device as claimed in claim 1, wherein the holder (36) is configured to hold therein an image-capturing device (38).

3. The gimbal device as claimed in claim 1, further comprising a base (102) on which the upright support (12) is mounted.

4. The gimbal device as claimed in claim 1, further comprising a joystick (50) provided on the upright support (12) for manually controlling the pan, roll and tilt motors (14, 24, 34).

5. The gimbal device as claimed in claim 1, further comprising a plurality of batteries (52) disposed in the upright support 12 for supplying electrical power to the pan, roll and tilt motors (14, 24, 34).

6. The gimbal device as claimed in claim 1, wherein the wireless communication unit (62) of the gimbal device (10) is communicated with the mobile device (64) via Bluetooth or WiFi.

7. The gimbal device as claimed in claim 1, wherein the first arm (20) is attached to the pan motor (14) by a set of screws (22).

* * * * *